Figure 1:
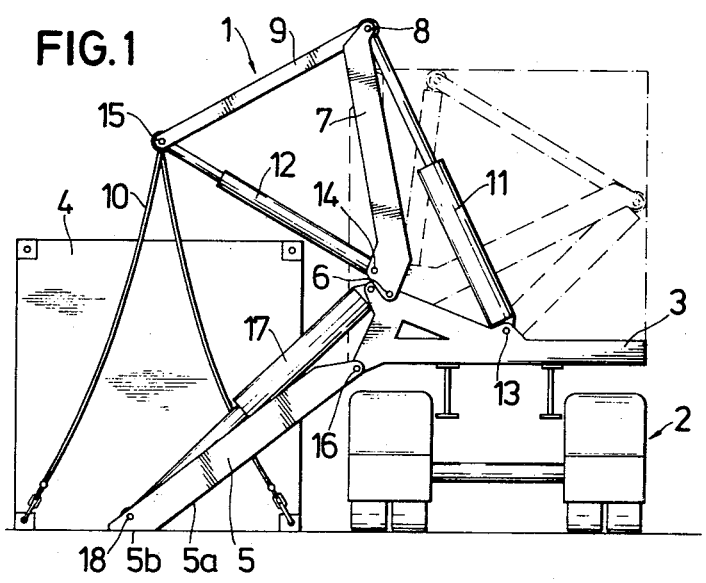

United States Patent [19]

Hammar

[11] 4,019,642
[45] Apr. 26, 1977

[54] LOADING DEVICE

[76] Inventor: Bengt-Olof Hammar, Olsforshus 510 35, Bollebygd, Sweden

[22] Filed: Aug. 11, 1975

[21] Appl. No.: 603,614

[52] U.S. Cl. .............................. 214/77 R; 212/145
[51] Int. Cl.² .......................................... B60P 1/48
[58] Field of Search .............. 214/77 R, 80, 38 CA, 214/38 CC; 212/8 R, 145; 280/764

[56] References Cited

UNITED STATES PATENTS

| | | | |
|---|---|---|---|
| 3,064,825 | 11/1962 | Thomas | 212/145 |
| 3,249,235 | 5/1966 | Roberts | 214/77 R X |
| 3,261,476 | 7/1966 | Gernhardt et al. | 212/145 X |
| 3,451,568 | 6/1969 | Kuster | 214/77R |
| 3,484,003 | 12/1969 | Strandberg et al. | 214/77 R |
| 3,495,726 | 2/1970 | Goldhofer | 214/77 R |
| 3,523,620 | 8/1970 | Klaus | 214/77 R |

*Primary Examiner*—L. J. Paperner

[57] ABSTRACT

Loading device arranged on a vehicle in order to carry out a side-wise transfer of a load onto or away from said vehicle, said device comprising two lifting means spaced from each other and movable substantially in parallel planes, each lifting means having a supporting leg which can be pivoted outside of the outer contour of the vehicle, said supporting leg being pivotably carried in a pivot bearing close to the outer contour of the vehicle, a piston-cylinder unit for pivoting said supporting leg having one end pivotably connected to the free end portion of said leg, the other end of said unit being pivotably carried in a bearing positioned further inside the contour of the vehicle and at a higher level than the pivot bearing of said supporting leg, and said supporting leg having a supporting surface extending substantially along the main portion of said leg whereby to make it possible to adjust the position of the device with respect to supporting foundations on different levels.

2 Claims, 2 Drawing Figures

U.S. Patent

April 26, 1977

4,019,642

LOADING DEVICE

The present invention relates to a loading device arranged on a vehicle in order to carry out a sidewise transfer of a load 4 onto or away from said vehicle, said device comprising two lifting means 1 located at a certain distance from each other and movable substantially in two in between them parallell planes of movement and being provided each one with its supporting leg 5, which can be swung outside of the outer contour of the vehicle.

It is an object of the present invention to provide a loading device with supporting legs exhibiting a stable and simple design, which makes it possible by means of a simple operating device to adjust the position of the device with respect to supporting foundations on different levels.

Said object is reached by means of the device according to the present invention, which substantially is characterized by the supporting legs 5 being pivotably carried in bearings close to the outer counter of the vehicle 2 and by being provided with a supporting surface 5a extending substantially along the whole length of said supporting leg.

Figure 2:
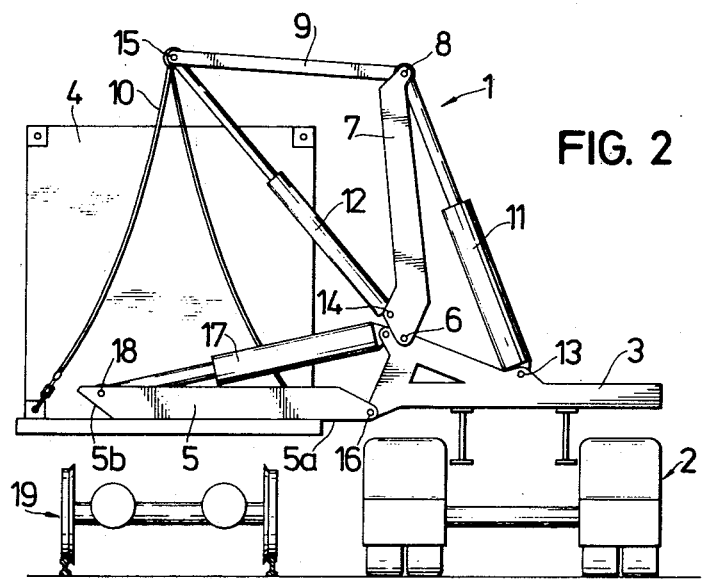

The invention will now be described more in detail in connection with an example of embodiment thereof, reference being made to the accompanying drawing, in which FIG. 1 is a view of the loading device according to the present invention exhibiting two positions during the transfer of a load from the ground level onto a vehicle, and FIG. 2 illustrates the loading device in connection with the transfer of a load from a railroad car onto the vehicle.

As is evident from the drawing the loading device according to the invention is arranged on a vehicle, where it is intended to carry out the transfer of loads onto said vehicle from foundations on different levels. The loading device comprise substantially two lifting means 1, which are arranged at a certain distance from each other on a frame 3 fixed on the vehicle, said lifting means being intended substantially to cooperate in between them in order to lift a load 4 located between them. Further a supporting leg 5 arranged for each one of the lifting means enters into the loading device assembly, said leg being intended to counteract the oblique load by supplying a means that can rest on a firm foundation.

Each lifting device 1 substantially comprises an under-arm 7 pivotably carried in a hinge 6 on the frame 3 and an over-arm 9 of which one end is pivotably carried in a hinge 8 at the top of said under-arm. From the other end of the said over-arm a lifting tackle in the form of a lifting rope 10 parts, said rope being intended to be tied to the load, which in the example illustrated is a container 4. For the operation of the two lifting arms 7, 9 two piston-cylinder units 11, 12 are provided, one of which at its low end being pivotably connected by means of a hinge 13 to the frame 3, its other end being pivotably connected by means of a hinge 8 to the top of the under-arm 7, while the other piston-cylinder unit 12 at one end by means of a hinge 14 is pivotably connected with the under-arm 7 close to the low end of the latter one, its other end by means of a hinge 15 being pivotably connected with the one end of the over-arm 9 from which the lifting tackle 10 is parting.

The supporting leg is pivotably connected to the frame 3 by means of a hinge 16 substantially located at the outer contour of the vehicle, said leg being operated by means of a piston-cylinder unit 17 likewise pivotably connected with the frame by means of a hinge, said piston-cylinder unit at its outer end by means of a hinge 18 being pivotably connected with the free end of the supporting leg. The supporting leg further exhibits a substantially plane supporting surface 5a extending along its whole length and moreover an oblique supporting surface 5b at its free end.

When loading a container 4, which by way of example is on the ground, the two supporting legs 5 are pivoted from the parking position indicated with dashed and dotted lines into the position indicated with continuous lines, the supporting legs with their oblique surface 5b arriving in bearing contact with the surface of the ground. Further the lifting arms 7, 9 of the lifting means by means of the piston-cylinder units 11, 12 are swung outwards from the parking position indicated with dashed and dotted lines to the lifting position indicated with continuous lines, whereafter the lifting rope is hooked on and the loading of the container can begin. The lifting movement can be provided by the two piston-cylinder units 11, 12 operating the two lifting arms 7, 9 in each one of the lifting means 1, whereafter the lifting means will occupy the parking position indicated with dashed and dotted lines. The supporting leg 5, which in this connection serves the purpose of a ground support, thus counteracts the oblique load arising during the lifting movement, as long as the container is in such a position that the common center of gravity of the vehicle, the loading device, and the load does not deviate from the normal position of the center of gravity of the vehicle. After termination of the loading operation the supporting leg 5 is swung in upwards direction to the parking position indicated with dashed and dotted lines, which movement is carried out in a simple manner by means of the piston-cylinder unit 17. No part of the lifting device including the supporting legs then is outside of the outer contour of the vehicle.

When the vehicle is loaded from a level, which only slightly differs from the load supporting level of the vehicle, as is the case illustrated in FIG. 2, where a container is loaded from a railroad car 19, the supporting leg 5 is swung out in such a manner that, it suitably will arrive in bearing contact against the foundation in question with its long supporting surface 5a. This complete bearing contact is obtained automatically by the springing suspension of the frame 3 relative to the chassis of the vehicle, so that the frame will occupy such an inclination that the pivoting hinge 16 of the supporting leg substantially will arrive at the same level as said foundation and consequently the complete bearing contact is made possible.

The invention is not limited to the example of embodiment described above and illustrated in the drawing, but several modifications can be imagined within the scope of the following claims.

What I claim is:

1. Loading device arranged on a vehicle having a frame spring mounted on a chassis, said device being adapted to carry out a side-wise transfer of a load onto or away from said vehicle and comprising two lifting means spaced from each other and movable substantially in parallel planes, each lifting means having a supporting leg which can be pivoted outside of the outer contour of the vehicle, said supporting leg being pivotably carried in a pivot bearing close to the outer contour of the vehicle and having a free end portion, a piston-cylinder unit for pivoting said supporting leg having one end pivotably connected to the free end portion of said supporting leg, the other end of said piston-cylinder unit being pivotably carried in a bearing positioned further inside the contour of the vehicle and at a higher level than said pivot bearing of said supporting leg, said supporting leg having a supporting surface extending substantially along the main portion of said leg, and said supporting surface being adapted to reach plane contact with an adjacent load surface by springing action of the vehicle frame relative to the chassis so that the pivot bearing of the supporting leg will arrive substantially at the same level as the adjacent load surface.

2. Loading device according to claim 1, wherein said supporting leg has a supporting surface at its free end portion adapted to provide a ground support.

* * * * *